D. Sattler.
Saw.
N° 81,413. Patented Aug. 25, 1868.
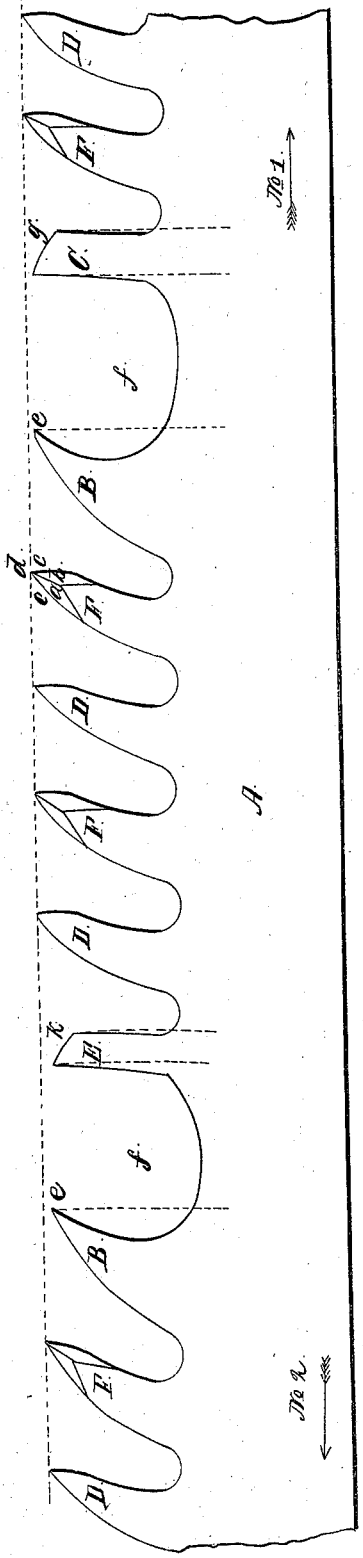
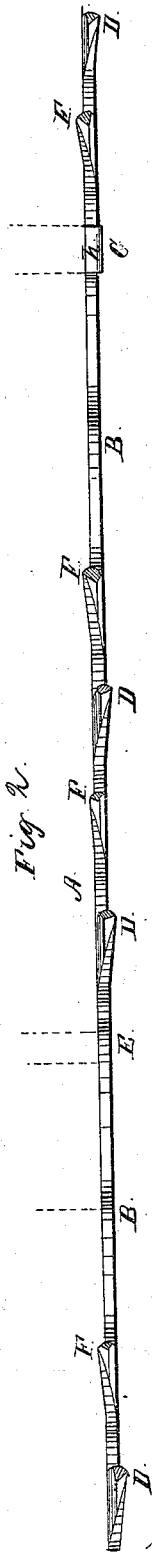
Witnesses:
R. R. Abbott
Ed. L. Beetrah
Inventor:
David Sattler
by Jo. Abbott

United States Patent Office.

DAVID SATTLER, OF MIFFLIN, OHIO.

Letters Patent No. 81,413, dated August 25, 1868.

IMPROVEMENT IN SAWS.

The Schedule referred to in these Letters Patent and making part of the same.

TO ALL WHOM IT MAY CONCERN:

Be it known that I, DAVID SATTLER, of Mifflin, in the county of Ashland, and State of Ohio, have invented new and useful Improvements in Saws; and I do hereby declare that the following is a full, clear, and exact description of my invention, reference being had to the accompanying drawings, forming a part of this specification, and to the letters of reference marked thereon, of which drawings—

Figure 1 is a side view of a cross-cut saw, with my improvements.

Figure 2 is a plan of the same.

The nature of my invention consists in the novel construction and arrangement of teeth on a cross-cut saw, said teeth consisting of knife-teeth, planing-teeth, gauge-teeth, and clearing-teeth, which are so arranged on the saw that the knife-teeth shall cut the sides of the kerf, and the planing-teeth plane out the centre of the kerf, while the gauge-teeth are so arranged as to assist the knife-teeth in cutting the sides of the kerf, and at the same time prevent the planing-teeth from taking too much feed in the kerf, and the clearing-teeth serve to carry out of the kerf the saw-dust that is not removed by the planing-teeth, and also act in some degree as gauges for the planing-teeth.

The peculiar utility of my improved saw consists in the fact that, while possessing all the advantages common to the system of knife and planing-teeth, it keeps much freer from saw-dust than any other saw, thereby lessening the amount of power required to operate it, while it has a much more uniform feed than other saws with the knife and planing-teeth, as the novel construction of the gauge-teeth causes the feed to be regulated by the movement of the end of said gauge-teeth over the path of the knife-teeth, where it is but little affected by any saw-dust in the kerf, which has heretofore seriously affected the efficiency of this class of saws; and another advantage resulting from the form of the gauge-teeth is, that the feed of the saw adjusts itself to the lumber to be sawed, whereas all the former saws of this class have a uniform feed for all classes of timber, or else would feed very unevenly—feeding too fast in hard timber, and too slow, or not at all, in soft or rotten timber.

To enable others skilled in the art to make and use my invention, I will proceed to describe its construction and operation.

A represents the body of the saw, on which are cut the knife-teeth D F, planing-teeth B B, gauge-teeth C, and clearing-teeth E.

The knife-teeth D F are filed into the form shown, having two bevelling-faces $a$ $b$, which have knife-edges at the upper sides $c$ $c$, and come to a sharp point at $d$.

These knife-teeth are "set" so that the teeth D D cut down one side of the kerf, and the teeth F F down the other side.

The planing-teeth B B have no "set," and are filed to a sharp planing-edge, $e$, as shown.

They are arranged through the saw, between sets of two or more planing-teeth, D F, and have a large space, $f$, left in front of them, where the saw-dust or chips which they plane from the kerf accumulate and are carried to the outside of the log.

The gauge-teeth C are made with a curved knife-edge, $g$, arranged with reference to the planing-teeth, as shown, their upper ends being cut off by an oblique face, $h$.

They are given such "set" as will cause them to follow in the path of one set of the knife-teeth D or F, as shown in fig. 2, and are placed, one opposite each planing-tooth, excepting at the planing-tooth where the clearing-tooth is used.

The clearing-tooth E is made with a square, rounding face, $k$, arranged with reference to the planing-tooth B, as shown.

There is usually but one clearing-tooth E used on a saw, but more can be used, if desirable, their function being that of carrying back (during the backward stroke of the saw) the saw-dust left by the planing-teeth B in the forward stroke, and throwing it out at the other side of the log.

They are placed back at a distance from the front end of the saw equal to about two-fifths the whole cutting-length of the saw.

The relative length of the several teeth is shown by red line in fig. 1, from which it is seen that all the knife-teeth D F are of the same length, while the planing-teeth B B are made a little shorter than the knife-teeth D F, but are each of the same length.

The gauge-teeth C are a little shorter than the planing-teeth B, while the clearing-teeth E are shorter than the gauge-teeth.

Suppose, now, the saw to be moving in the direction indicated by the arrow No. 1, which represents the direction of the forward movement of the saw. The knife-teeth D F cut down the side of the kerf a distance equal to or very little greater than the difference in length between these teeth and the gauge-teeth C, and the planing-teeth B B take off a shaving a little thicker than the difference in length between the planing-teeth and the gauge-teeth E, depending on the amount the gauge-teeth cut down the side of the kerf, but never quite equal to the distance cut down by the knife-teeth D F.

If the planing-teeth take too much feed, the rounding edges $g$ of the gauge-teeth C raise the saw and prevent this undue amount of feed, the clearing-tooth E, by the action of its curved face $k$ on the saw-dust in the bottom of the kerf, aiding in this raising of the saw.

When the saw commences to move in the direction shown by arrow No. 2, which shows the direction of the backward movement, the ends $c\ c$ of the planing-teeth B B act as gauges to the knife-teeth D F, while the clearing-teeth E gather up the saw-dust left by the planing-teeth B B, in the forward movement of the saw, and carry it out of the kerf.

Having thus fully described the construction and operation of my improved saw, I wish it understood that I do not claim as my invention the clearing-teeth E, nor the knife-teeth D and F, nor the planing-teeth B, nor the spaces $f$ in front of said planing-teeth; but

What I do claim as my invention, and desire to secure by Letters Patent, is—

The peculiar arrangement and combination of the knife-teeth D F, planing-teeth B B, gauge-tooth C, and clearing-tooth E, on the saw-blade A, when the several parts are constructed and arranged substantially as and for the purpose herein specified.

As evidence that I claim the foregoing, I have hereunto set my hand in the presence of two witnesses, this 4th day of May, A. D. 1868.

DAVID SATTLER.

Witnesses:
  J. W. SMITH,
  M. H. MANSFIELD.